S. GORDON.
CUSHIONED TIRE FOR AUTOMOBILE WHEELS.
APPLICATION FILED NOV. 18, 1910.
991,612.  Patented May 9, 1911.
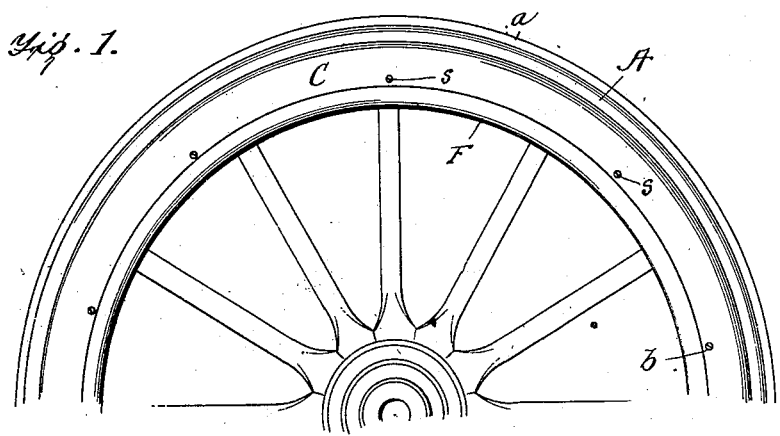
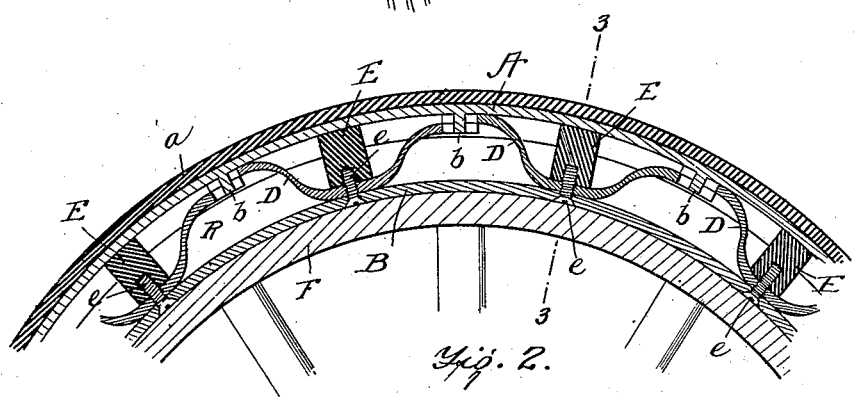
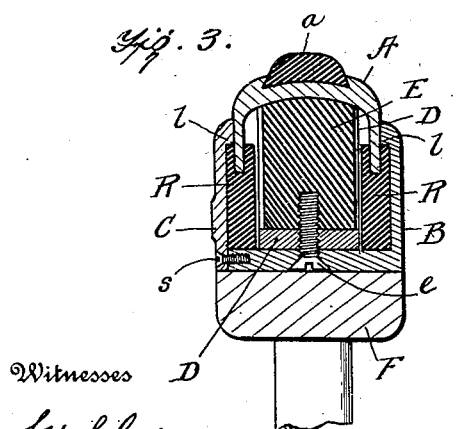
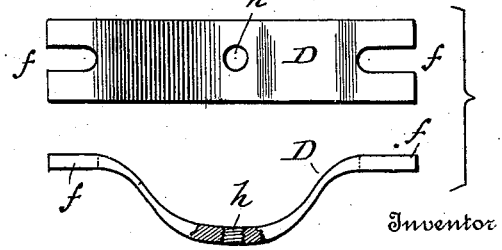
Witnesses
L. H. Schmidt
Inventor
Simon Gordon,
By Edw. W. Byrn.
Attorney

UNITED STATES PATENT OFFICE.

SIMON GORDON, OF WASHINGTON, DISTRICT OF COLUMBIA.

CUSHIONED TIRE FOR AUTOMOBILE-WHEELS.

991,612.

Specification of Letters Patent. Patented May 9, 1911.

Application filed November 18, 1910. Serial No. 593,060.

*To all whom it may concern:*

Be it known that I, SIMON GORDON, a citizen of the United States, residing at Washington, in the District of Columbia, have invented certain new and useful Improvements in Cushioned Tires for Automobile-Wheels, of which the following is a specification.

The high price of rubber tires for automobiles, together with the dangers and embarrassments incident to the puncturing and bursting of the same, make a practical cushion tire of mechanical form a great desideratum, but great difficulty has been experienced in providing a metallic spring tire which would be sufficiently elastic and still exclude dirt and sand and thus avoid wear on the moving parts. Metallic springs of the semi-elliptical forms and various other shapes have been heretofore incorporated between an inner and outer rim for this purpose.

My invention relates to that form which employs semi-elliptical springs and consists in the novel construction and combination of parts whereby an elastic tire is provided and the problems of dirt exclusion and wear are taken care of in a simple and practical way as hereafter more fully described with reference to the drawing, in which:

Figure 1 is a partial side elevation of a cushioned tire constructed in accordance with my invention. Fig. 2 is an enlarged sectional view of a part of the tire taken through the plane of the wheel. Fig. 3 is a transverse section taken on line 3—3 of Fig. 2, and Fig. 4 are details, shown in side and edge views, of one of my improved semi-elliptical springs used in the tire.

Referring to the drawing, the tire is composed of an outer rim A and an inner rim B C. The outer rim A is cast hollow or otherwise formed in a single circular piece with a rounded outer face and two side flanges projecting inwardly. The inner rim is composed of a piece B cast or otherwise formed in one piece with a flat peripheral ring having at one edge a flange projecting outwardly at right angles and a ring C which is rigidly connected to the part B by screws $s$ and substantially matching the flange on the other side of the inner ring and being substantially parallel with said flange. The outer portion A of the rim has an annular chamber opening inwardly and the inner portion B C has an annular chamber opening outwardly and the inner rim portion is somewhat wider than the outer rim portion, so that the latter fits inside the inner rim portion and forms with it an annular or ring-shaped chamber closed in by the two parts movable in relation to each other and in which are placed the springs and dirt excluding devices.

At the joint between the inner and outer portions of the rim there are arranged two soft rubber rings R extending entirely around the periphery of the wheel, one on each side. These rings have their greatest transverse dimensions parallel to the plane of the wheel. Each of these rubber rings has in its outer edge a peripheral groove which receives the inwardly projecting metal flanges of the outer rim, while the inner edges of these rubber rings fit and rest snugly against the flat bottom portion of the inner rim. There is an inwardly projecting lip $l$ for each flange that holds the rubber ring in place. Inside of these rubber rings and between the inner and outer portions of the metal rim are arranged metal springs of the type known as bowed, leaf, or semi-elliptical springs D, a series of which extends all around the wheel. The construction of these springs is shown in Fig. 4. Each consists of a single flat piece of tempered steel equal in width approximately to the hollow ring-shaped chamber and each has slotted ends forming a fork $f$ at each end and each has also a central hole $h$. At the forked ends and at the central hole the spring is made considerably thicker than at the intervening portions for the purposes hereinafter described.

The outer rim portion has formed on it integrally at distances apart representing the normal length of a spring, inwardly projecting pins or lugs $b$ adapted to fit easily in the slotted spaces between the ends of the forks $f$. The curve of the spring is such that when the outer ends embrace these pins on the outer rim the middle portion of each spring rests against the base of the inner rim and to which each spring is connected rigidly by a single heavy screw $e$ countersunk in the inner rim and extending outwardly through a hole in the same and having its thread meshing with a screw thread tapped in the thickened middle portion of the spring and extending outwardly a short distance through the same. The object in making the middle portion of the spring heavier than its end portions is to strengthen it at the point where the hole goes through it and also to give a sufficient body of metal for the screw to engage with threads in the spring like a nut. The thickening of the forked ends of the spring is also to strengthen and reinforce the ends where they slidably embrace the guide pins or lugs *b* and where they are subjected to wear as the springs spread and move back and forth over said pins under the influence of the inwardly yielding movement of the outer rim.

At the point where the screws *e* protrude through the springs D are placed a series of soft rubber blocks E which have holes in them to receive the outwardly projecting ends of the screws, whereby they are held in position against displacement. These rubber blocks E form buffer springs that receive and take up a portion of the strain on the inward movement of the outer rim and thus relieve the metal springs from all breaking strains incident to unusual jolts or jars in traveling on rough roads. The rubber blocks E approximately fill the hollow chamber in transverse direction but should have a slight free space between them and the rubber rings R to avoid friction and also afford a slight space for bulging or expansion when under compression.

Inside the inner metal rim B is snugly fitted any form of felly F of wood or metal to which the spokes are attached and in the outer face of the outer rim A is embedded firmly a soft rubber tread or face *a* to secure greater tractive effect on the road bed and also to render the tire noiseless on paved streets.

The rotative effect of the inner rim on the outer rim is secured through the agency of the series of springs D extending all around the wheel and bearing at their ends against pins or lugs *a;* also through the frictional contact of the side rings R R and the buffer blocks E of rubber.

With the tire as thus constructed it will be seen that as the outer rim portion yields inwardly at the point of contact with the road bed the greater portion of the strain is borne by the metallic leaf springs, but a portion of the strain is also taken up by the elastic buffer blocks E and also by the elastic side rings R R which extend all around the periphery and serve the double purpose of cushioning the outer rim as it moves inwardly and also packing the joint so that dirt and water cannot get into the interior chamber and all wear and obstruction due to the same is avoided.

I claim:

1. A cushion tire for wheels, comprising an inner rim portion having two outwardly projecting flanges with inside shoulders at their outer edges, an outer rim portion having two inwardly projecting flanges fitting inside the flanges of the inner rim portion, springs interposed between the two rim portions and two flat elastic packing rings having their greatest transverse dimensions parallel to the plane of the wheel and interposed between the flanges of the two rim portions and retained by the shoulders of the outwardly projecting flanges to make a dirt proof joint.

2. A cushion tire for wheels, comprising an inner rim portion having two outwardly projecting flanges, an outer rim portion having two inwardly projecting flanges fitting inside the flanges of the inner rim portion, semi-elliptical metal springs interposed between the two rim portions and two flat elastic packing rings arranged beside the metal springs and interposed between the flanges of the two rim portions to make a dirt proof joint, said packing rings being each formed with a groove in its outer edge and receiving therein the flanges of the outer rim portion and forming a cushion for the same.

3. A cushion tire for wheels, comprising an inner rim portion having two outwardly projecting flanges with inside shoulders at their outer edges, one of which flanges is made removable, an outer rim portion having two inwardly projecting flanges fitting inside the flanges of the inner rim portion, bowed metal springs interposed between the two rim portions and two flat elastic packing rings interposed between the flanges of the two rim portions and retained by the shoulders of the outwardly projecting flanges to make a dirt proof joint.

4. A cushion tire for wheels, comprising an outer rim portion and an inner rim portion having overlapping flanges forming a closed annular housing, springs arranged in the housing between the two rim portions and two flat elastic packing rings having their greatest transverse dimensions parallel to the plane of the wheel and arranged beside the springs and between them and the outer walls of the rim at the joint between the overlapping flanges and means for holding said packing rings against movement in outward direction.

5. A cushion tire for wheels, comprising an outer rim portion having inwardly projecting lugs, and an inner rim portion, said outer and inner rim portions having overlapping flanges, bowed springs having ends slidably connected to the outer rim portion, a screw connection for connecting the middle of each spring with the inner rim portion, and an elastic buffer block arranged within the bow of the spring and interposed between the middle of the spring and the outer rim portion.

6. A cushion tire for wheels, comprising an outer rim portion having inwardly projecting lugs, and an inner rim portion, a leaf spring having ends slidably connected to the outer rim portion, a screw connection for connecting the middle of the spring with the inner rim portion, and an elastic buffer block interposed between the middle of the spring and the outer rim portion and locked in place against displacement by the screw connection.

7. A cushion tire for wheels, comprising an inner rim portion having two outwardly projecting flanges, one of which is removable, an outer rim portion having inwardly projecting lugs and two inwardly projecting flanges fitting between the flanges of the inner rim portion, leaf springs connected in the middle to the inner rim portion and having ends slidably connected to the lugs of the outer rim, elastic packing rings arranged between the flanges of the inner and outer rim portions, and an elastic buffer block interposed between the middle of the leaf spring and the outer rim portion.

In testimony whereof I affix my signature in presence of two witnesses.

SIMON GORDON.

Witnesses:
F. A. MILLIGAN,
C. M. FORREST.

Copies of this patent may be obtained for five cents each, by addressing the "Commissioner of Patents, Washington, D. C."